Aug. 20, 1968 D. R. BOWERS 3,398,250

DELAY SWITCH FOR REVERSING ELECTRIC MOTORS

Filed Nov. 15, 1966 4 Sheets-Sheet 2

Aug. 20, 1968 D. R. BOWERS 3,398,250

DELAY SWITCH FOR REVERSING ELECTRIC MOTORS

Filed Nov. 15, 1966 4 Sheets-Sheet 3

3,398,250
DELAY SWITCH FOR REVERSING ELECTRIC MOTORS

Donald R. Bowers, Akron, Ohio, assignor to The Hoover Company, North Canton, Ohio, a corporation of Delaware Filed Nov. 15, 1966, Ser. No. 594,580
10 Claims. (Cl. 200—157)

ABSTRACT OF THE DISCLOSURE

Electrical switch means is connected for reversing the direction of rotation of an electric motor. Stop means is arranged at the "off" position so the switch means cannot be moved directly from one "on" position to the other and this provides a mechanical delay in reversing rotation of the motor.

The present invention relates to a delay switching device for reversing the direction of rotation of the armature of fractional horsepower A-C series motors commonly referred to as universal motors. When such a motor is running at high speed in one direction a rapid reversal of polarity of electrical connections to either the field or armature windings causes a large amount of current to flow through the motor as it brakes and causes considerable sparking at the commutator which reduces the life of the carbon motor brushes as they tend to burn or wear out much faster than when the motor is slowed or stopped before reversing the polarity of electrical connections.

This problem is well known in the art and time delay switches for effecting reversal are well known in a very broad sense. Such prior switching devices are true time delays in that they cannot be instantaneously switched from one position to another without first releasing the actuator or stopping it in the off position to allow a mechanical time device to trip and permit movement to the other position.

Such prior delay switching devices are very expensive due to the built-in mechanical timing or delay device and are economically feasible only on very expensive machinery where they constitute a miniscule portion of the cost of the entire device. For low cost devices such as household appliances and hand tools it is desirable to have a switching device which requires delay when reversing while still using conventional low cost switches without an expensive built-in timing delay.

According to the present invention a delay is provided while using conventional switches by using a special actuator or stop means which requires the operator to laterally shift the actuator or stop means at the off position before reversing. This is accomplished in the present invention by providing a special operating button which is movable in a Z- or U-shaped path, or by requiring movement of stop means by the operator so that three movements are required. The delay necessitated by such an arrangement greatly reduces sparking at the commutator by requiring stoppage or substantial slow down of the motor before reversal.

Where a motor is drivingly connected to a gear train it is another reason to stop or slow down the motor before reversing the direction of rotation because the sudden braking force produced by instantaneous reversal at high speed puts a high strain on the gear train and other driving parts. Without delay the reversing, the parts of the driving train must be overdesigned at great expense in materials and loss of compactness. Therefore, it is desirable to delay reversal so that the driving train will not be subjected to repeated high strains due to instantaneous braking in reversing which will cause immediate failure or substantial reduction of life of the parts before failure.

In addition to a simple mechanical delay the present invention provides a single operating member for selectively actuating a pair of switches connected for reversing a motor and at the same time requires a delay in reversal.

Therefore, it is a principal object of this invention to provide a delay swtching device for reversing the direction of rotation of electrical motors while maintaining simplicity in construction and operation, as well as economy in manufacture.

It is another object of this invention to provide a single operating member for selective operation of two separate switches which are connected to effect reversal of an electric motor while also providing a built-in delay movement when sequentially actuating the switches.

Other objects and advantages of the present invention will be apparent to those skilled in the art as the description proceeds in connection with the accompanying drawings wherein:

FIGURE 8(*a*) is a sectional plan view taken in the direction of arrows 8—8 of FIGURE 7 and showing the operating member in a shifted, switch actuated position.

Figure 11:
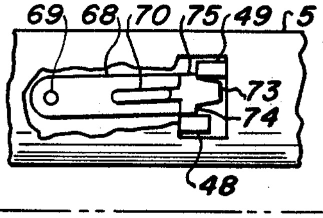
Figure 11:
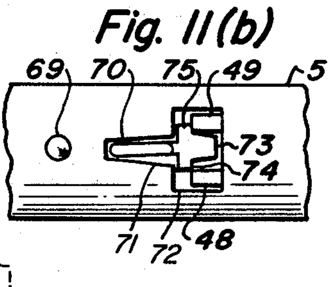
Figure 10:
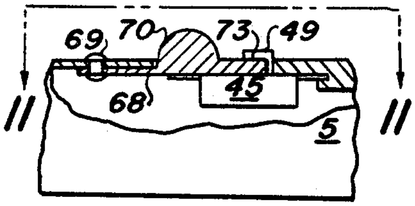
FIGURE 10 is a partial sectional side view showing another embodiment of the present invention.

FIGURES 11(*a*) and 11(*b*) are plan views taken in the direction of arrows 11—11 of FIGURE 10 showing the switches in different actuated positions and with portions cut away in FIGURE 11(*a*) for clarity.

Figure 12:
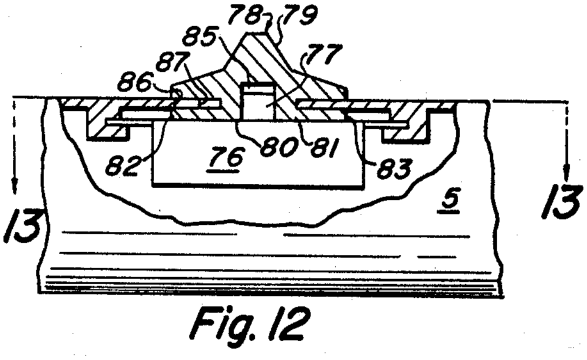

FIGURE 12 is a partial sectional side view showing another embodiment of the present invention.

Figure 13:
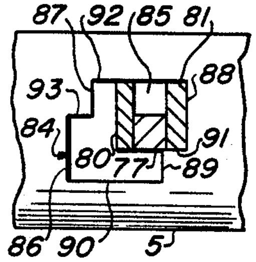
Figure 13:
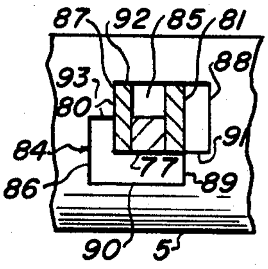
Figure 13:
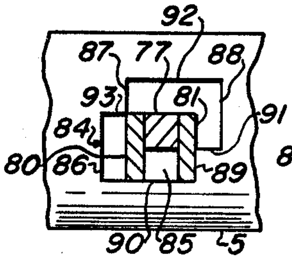
Figure 13:
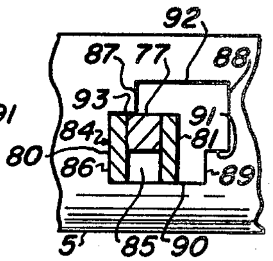

FIGURES 13(*a*), 13(*b*), 13(*c*) and 13(*d*) are plan views taken in the direction of arrows 13—13 of FIGURE 12.

Figure 14:
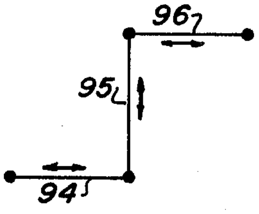

FIGURE 14 is a diagrammatic sketch showing the movement and different positions of the embodiment of FIGURES 12 and 13.

Figure 15:
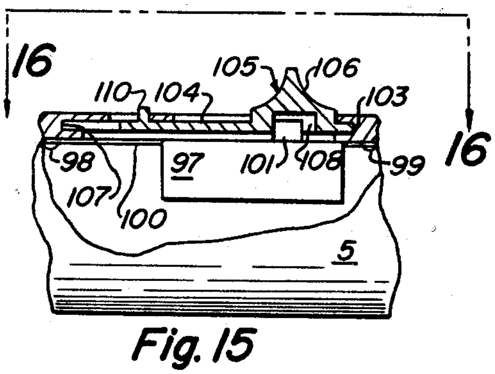

FIGURE 15 is a partial sectional side view showing another embodiment of the present invention.

Figure 16:
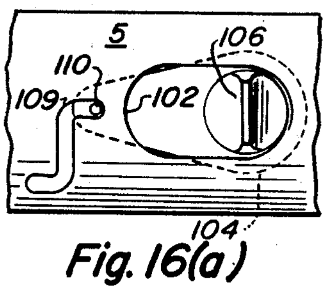
Figure 16:
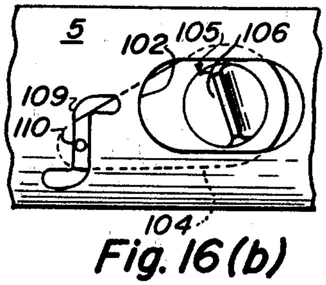
Figure 16:
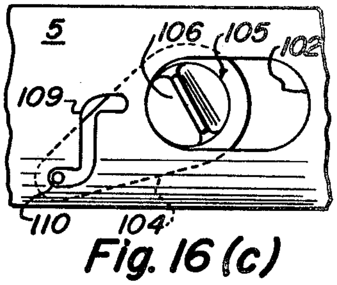

FIGURES 16(*a*), 16(*b*) and 16(*c*) are plan views taken in the direction of arrows 16—16 of FIGURE 15 showing the switch in different actuated positions.

Figures 17A, 17B, 17C, 17D:
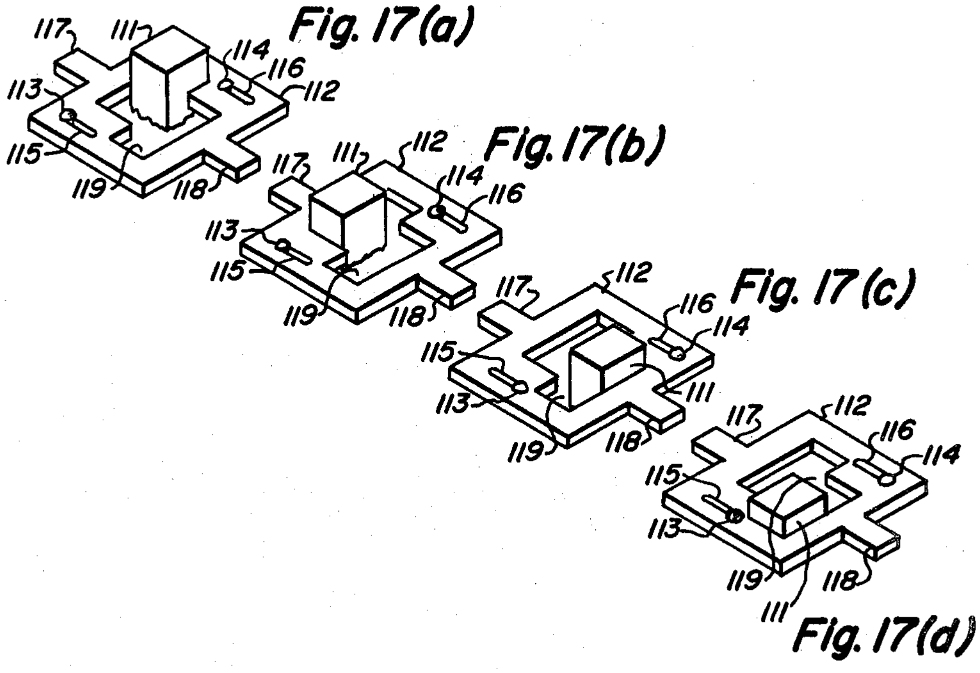

FIGURES 17(*a*), 17(*b*), 17(*c*) and 17(*d*) are isometric views of another embodiment of the present invention showing the switch in different actuated positions.

Figures 1, 4, 5, 6:
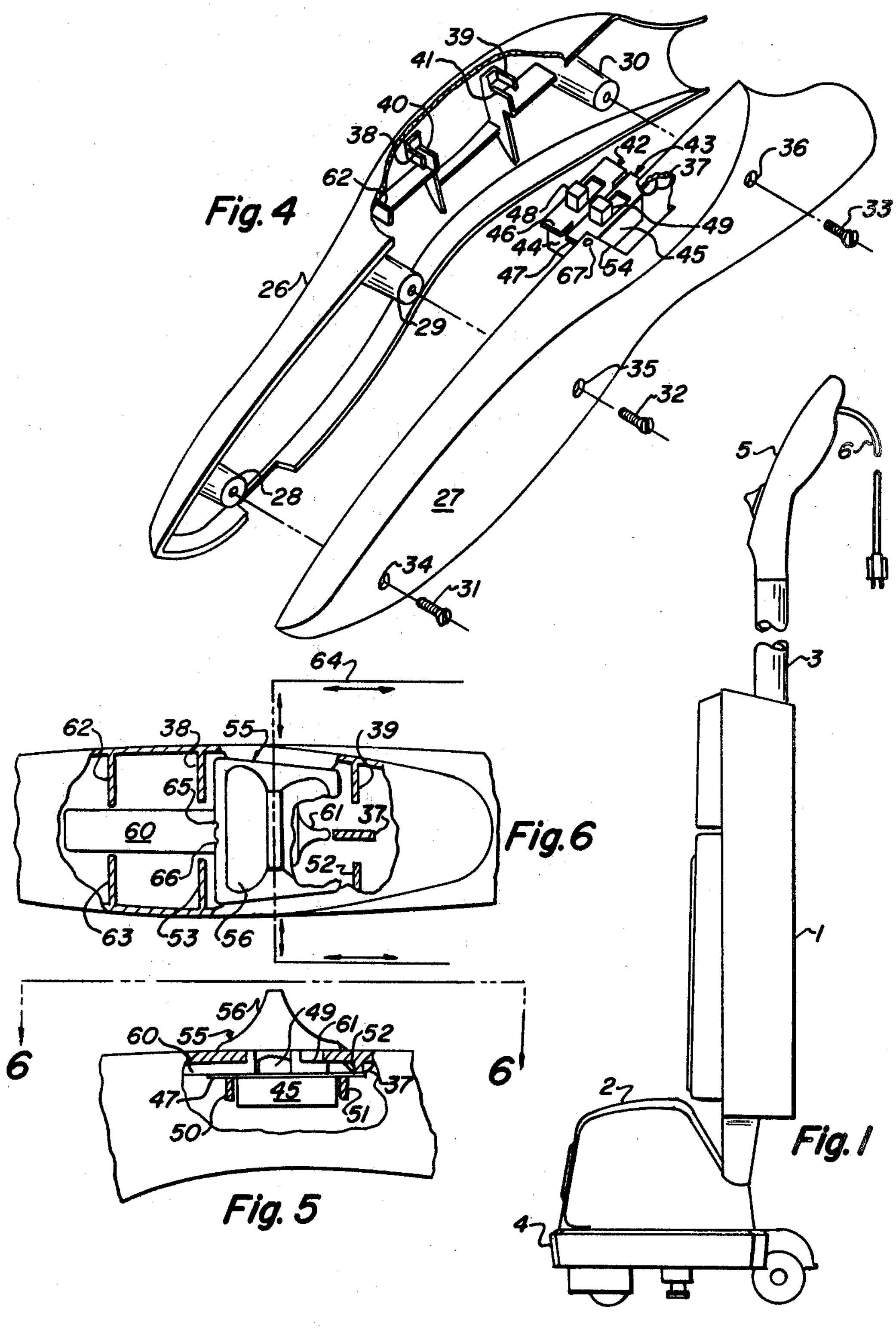
FIGURE 1 is a view of a floor scrubbing appliance having an electric motor and embodying the present invention.
FIGURE 4 is an isometric view of the handgrip for the appliance of FIGURE 1 showing a manner of mounting the switches.
FIGURE 5 is a partial side view of the handgrip of FIGURE 2 with portions cut away and showing the mounting of the switch operating member on the handgrip.
FIGURE 6 is a top plan view taken on line 6—6 of FIGURE 5 with portions cut away, and showing the mounting of the switch operating member.

Referring now to FIGURE 1 there is shown a floor cleaning appliance generally indicated by numeral 1. Appliance 1 includes a series type electric motor of the type referred to as a universal motor enclosed within hood 2. A handle 3 connected to the main support 4 includes a handgrip 5 in which an electrical switching device is mounted. Power cord 6 is adapted to be plugged into an electrical outlet for supplying current to the motor through the switching device. Appliance 1 has rotatable brushes driven by the motor for scrubbing a floor, and a suction fan also driven by the motor for removing liquid from a floor through a suction nozzle. The motor in appliance 1 is reversible so that in one direction of rotation the scrubbing brushes are rotatably driven in engagement with a surface to be scrubbed and in another direction of rotation the suction fan is driven to suck liquid off a surface. Details of such an appliance are disclosed in copending applications of Robert F. Dyer Serial No. 594,624 filed November 15, 1966, Louis E. Segesman Serial No. 594,551 filed November 15, 1966 and Brandt F. Ziegler Serial No. 594,623 filed November 15, 1966. The details of the operation of the appliance are not important to the present invention as the present invention is usable with any device having a reversible motor where delay in reversing is desired.

Figure 2:
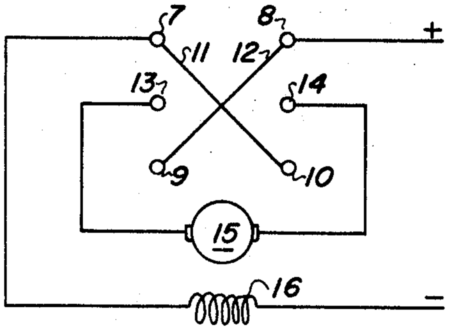
FIGURE 2 is a diagrammatic sketch showing the electrical circuit and connections for reversing an electric motor with a four pole double throw switch.

FIGURE 2 shows a well known electrical circuit for reversing a universal motor using a four pole double throw switch. Poles 7, 8, 9 and 10 are cross connected by wires 11 and 12 as shown, and contacts 13 and 14 of the double throw switch are selectively connectable with either contacts 7 and 8 or 9 and 10. When the switch is thrown so that contacts 7 and 13, and 8 and 14 are connected current will flow from left to right through armature 15 and then through field windings 16. When contacts 9 and 13, and 10 and 14 are connected current will flow to the right through armature 15. This reversal of polarity or the direction of current flow effects reversal of the direction of rotation of the motor armature as is well known. The same reversal can be effected by reversing the polarity or direction of current flow through field windings 16 rather than armature 15 simply by reversing their positions in the circuit as is well known.

Figure 3:
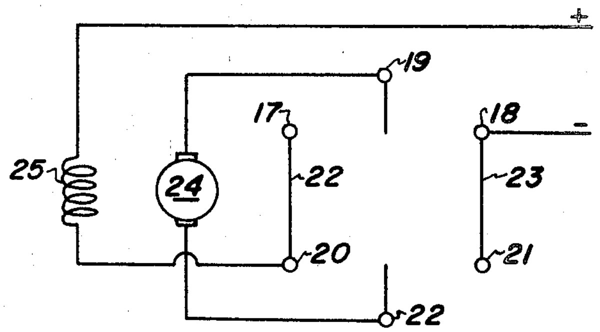
FIGURE 3 is a diagrammatic sketch showing the electrical circuit and connections for reversing an electric motor with two separate double pole single throw switches.

FIGURE 3 shows an electrical circuit for reversing a universal motor by using two double pole single throw switches. One switch has poles 17 and 18, and throwable blade contact 19. The other switch has poles 20 and 21, and throwable blade contact 22. Poles 17 and 20, and 18 and 21 of the two switches are connected by wires 22 and 23. When contact 19 is connected with pole 18 and contact 22 is connected with pole 21 there is an open circuit. When contact 19 is connected with pole 17 and contact 22 is connected with pole 21 the current flows downwardly through armature 24 and then through field windings 25 to effect one direction of rotation of the armature. When contact 19 is connected with pole 18 and contact 22 is connected with pole 20 current flows upwardly through armature 24 to effect rotation of the armature in the opposite direction. Reversing the positions of armature 24 and field 25 will also effect reversal of the motor in a well known manner.

FIGURE 4 shows a handgrip molded in two substantially symmetrical halves 26 and 27, preferably of plastic material. The halves are symmetrical except that half 26 has bored bosses 28, 29 and 30 for receiving screws 31, 32 and 33 through holes 34, 35, and 36 in half 27. Half 27 does not have bosses as does half 26. Also, stop member 37 need be formed only on half 27 projecting from the top edge thereof as shown. The top portion of handgrip half 26 is cut away as shown in FIGURE 4 to show upper supports 38 and 39 which have their bottom edges spaced upwardly and laterally from the top edges of lower supports 40 and 41. Handgrip half 27 has supports symmetrical with supports 38–41. A pair of conventional double pole single throw slide switches 42 and 43 have body portions 44 and 45, and top mounting portions 46 and 47 which extend beyond both ends of the body portions of the switches to form mounting flanges. Conventional slide actuating buttons 48 and 49 also form part of switches 42 and 43. The end extensions which form mounting flanges on mounting portion 46 of switch 42 are received between supports 38 and 40, and 39 and 41. Switch 43 has the end flanges of its mounting portion 47 received between supports in handle half 27 corresponding to supports 38–41 in handle half 26. Corresponding supports 50, 51 and 52 in handle half 27 are shown in FIGURE 5 and support 52 in FIGURE 6. When handle halves 26 and 27 are secured together they clamp switches 42 and 43 together against movement from one side to another and the supports in handle halves 26 and 27 prevent movement of switches 42 and 43 in any other direction. It will be noted that switches 42 and 43 have their actuating buttons 48 and 49 spaced apart because they are centered on mounting portions 46 and 47. Supports 38–41 and 50–53 project short of the mating edges of handle halves 26 and 27 so that they do not extend into lines defining the outer edges of the space and the supports themselves are spaced as illustrated by supports 38 and 53, and 39 and 52 in FIGURE 6. Handle half 27 has a rectangular cut-out 54 in the top portion directly above switches 42 and 43 providing access to actuating buttons 48 and 49. Handle half 26 has a cut-out corresponding to cut-out 54 in handle half 27.

Figures 7, 8, 8A, 9:
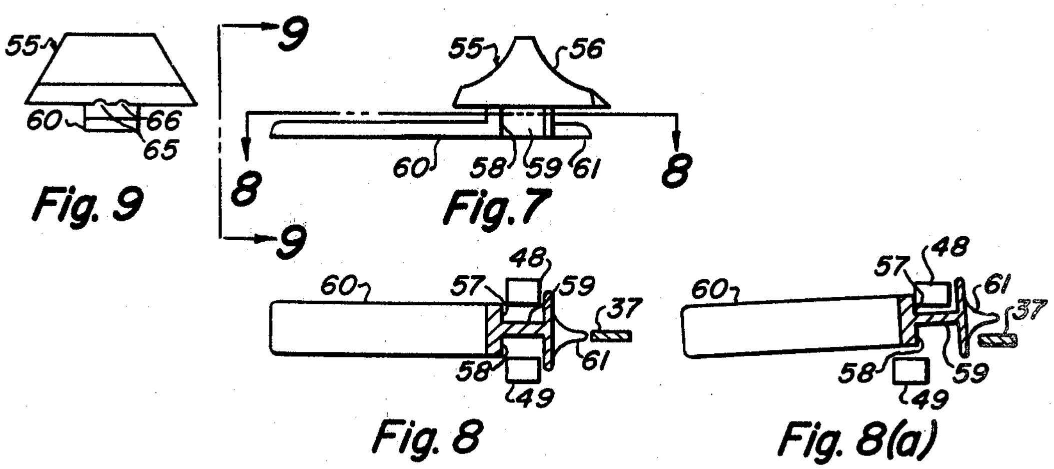
FIGURE 7 is a side view of the switch operating member of FIGURES 5 and 6.
FIGURE 8 is a sectional plan view taken on line 8—8 of FIGURE 7 and showing how the operating member actuates the switches.
FIGURE 9 is a rear view of the switch operating member taken in the direction of arrows 9—9 of FIGURE 8.

FIGURES 5–8(*a*) show a switch operating member 55 having a top portion 56 adapted to be operated on by the thumb of a person. The bottom portion of operating member 55 has a pair of oppositely disposed notches 57 and 58 therein which are wide enough to receive actuating buttons 48 and 49. Notches 57 and 58 are separated by a thin web 59. The bottom portion of operating member 55 has a rear tail 60 and a front extension 61 which have their top surfaces spaced below the underside of top portion 56 as shown in FIGURE 7 to receive the front and rear periphery of cut-out 54 in handle half 27 and the corresponding cut-out in half 26 as shown in FIGURE 5. Projections 62 and 63 on handle halves 26 and 27 loosely receive rear tail 60 on operating member 55 to stabilize the operating member during movement as will later be described.

The portion of operating member 55 which connects top portion 56 with tail 60 and front extension 61 is substantially smaller in all dimensions than the rectangular opening formed by opening 54 in handle half 27 and the corresponding opening in half 26 so that operating member 55 can move in all directions in the rectangular opening relative to the handgrip. FIGURES 5 and 8 show operating member 55 in its rearmost position and both of buttons 48 and 49 are in the rear off position. As seen in FIGURES 6 and 8 projection 37 is directly in front of front extension 61 when operating member 55 is in its rearmost position and in the center of its lateral movement to keep member 55 from being moved forward to actuate both switches 42 and 43. Thumb pressure on the right side of top portion 56 in FIGURE 6 causes operating member 55 to shift to a left most position in which switch button 48 is received in notch 57 and movement of operating member 55 forwardly moves button 48 to its on position as shown in FIGURE 8(*a*). As previously described with respect to FIGURE 3 this causes rotation of the motor armature in one direction. To reverse the direction of motor rotation it will be seen that button 48 must be pulled to its off position by moving operating member 55 rearwardly and then shifting member 55 to the right so that notch 58 receives button 49 to move it to the on position when member 55 is pushed forwardly. Thus, operating member 55 moves in a U-shaped path to reverse the motor and lateral movement is required in the off position which provides a delay. A diagrammatic sketch 64 is superposed on FIGURE 6 to show the movement of operating member 55. In order to help hold operating member 55 in either its right or left position of lateral movement in the off position the rear underside of top portion 56 is provided with a pair of grooves 65 and 66. An upwardly projecting detent 67 on handle half 27 in FIGURE 4 snaps into groove 65 when operating member 55 is moved to its right lateral position and into groove 66 when operating member 55 is in its left lateral position. This keeps operating member 55 from flopping from one side to another in its off position and guides its forward and rearward movement. Tail 60 on operating member 55 keeps the operating member from twisting so that it cannot jam up in the rectangular opening in the handgrip.

Referring now to FIGURE 10 there is shown a modified form of delay switching device including stop member 68 pivoted to handgrip 5 as by a rivet 69 for pivotal lateral movement. Stop member 68 has a projecting portion 70 extending through slot 71 forwardly of rectangular opening 72 in handgrip 5. Portion 70 is adapted to be pushed by the thumb of a person to shift stop member 68 laterally from one side to the other. Narrow extension 73 on stop member 68 extends between switch buttons 48 and 49, and forms side projections 74 and 75 which selectively prevent movement of either button 48 or 49. FIGURE 11(*a*) shows stop member pivoted laterally to the right with switch button 49 in its off position and switch button 48 in its on position to effect rotation of the motor in one direction to reverse the motor, switch button 48 must be pulled back to its off position and stop member 68 shifted laterally to the left to free button 49 from projection 75 so that it can be moved forward to the on position. Thus, motor reversal requires movement of the switches to the off position and then lateral shifting of the stop member at the off position which provides a delay at off position. When button 49 is forward, button 48 is stopped from forward movement by projection 74.

FIGURE 12 shows another form of delay switching device using a four pole double throw slide switch 76 connected in circuit as previously described with reference to FIGURE 2. Switch actuating button 77 on switch 76 has an intermediate off position and on positions forwardly and rearwardly of the off position. Switch operating member 78 has a top portion 79 adapted to be operated on by a person's thumb. A pair of spaced apart depending legs 80 and 81 project from the underside of top portion 79, and a pair of extensions 82 and 83 project outwardly from legs 80 and 81. Extensions 82 and 83 are spaced downwardly from the underside of top portion 79 to form recesses which receive peripheral portions of opening 84 in handgrip 5. Slot 85 between legs 80 and 81 receives switch actuator button 77. Opening 84 has endwalls 86, 87, 88 and 89 and sidewalls 90, 91, 92 and 93. Top portion 79 of operating member 78 is wide enough and long enough to completely cover opening 84 regardless of the position of member 78 so that the underside of top portion 78 is always in contact with the top periphery of opening 84. Legs 80 and 81 are only as wide as endwalls 86 or 88 as are extentions 82 and 83. Extensions 82 and 83 project outwardly to the end limits of top portion 79 so that the top edge of extension 83 is always in contact with the underside periphery of opening 84 adjacent either endwall 88 or endwall 89 and part of endwall 88, and the top edge of extension 82 is always in contact with the underside periphery of opening 84 adjacent either endwall 86 or endwall 87 and part of endwall 86. Opening 84 may be termed substantially Z-shaped or shaped like a letter S made with straight lines. FIGURE 13(*a*) shows the operating member in its rearmost position with leg 81 abutting endwall 88 and button 77 is in an on position. FIGURE 13(*b*) shows the operating member in an intermediate position with leg 80 abutting endwall 87 and button 77 is in its intermediate off position. In order to move button 77 to its other on position it is necessary to move operating member 78 sideways until legs 80 and 81 abut sidewall 90 as shown in FIGURE 13(*c*). This additional movement in the off position provides a delay in reversing. To reverse, the operating member is moved forward until leg 80 abuts endwall 86 as shown in FIGURE 13(*d*) and button 77 is in its other on position. FIGURE 14 is a diagrammatic sketch showing the movement of operating member 78 in reversing the switch from one on position to the other. It is seen that the operating member moves in three separate paths 94, 95 and 96, and a lateral movement is required at the intermediate off position.

FIGURE 15 shows another embodiment of a delay switching device. A conventional four pole double throw slide switch 97 having an intermediate off position and on positions forwardly and rearwardly of the off position is suitably mounted to handgrip 5 as by screws 98 and 99 passing through switch mounting plate 100 and into handle 5. Switch 97 has an actuating button 101. As shown in FIGURE 16(*a*) handgrip 5 has an oval opening 102 formed therein. Handle 5 may be made in two halves as described with reference to FIGURE 4. The rear and sides of opening 102 are notched as at in FIGURE 15 to receive the rear and rear side peripheries of the flattened bottom portion 104 of operating member 105 which also has a top portion 106 adapted to be operated on by the thumb, and thumb and finger of a person. The front portion of the handgrip ahead of opening 102 is recessed as at 107 to allow free movement of the forward portion of flattened bottom 104. Notch 103 slidably and rotatably holds member 105 and recess 107 allows uninhibited swinging and sliding movement of the forward portion of flattened bottom 104. Operating member 105 has a circular hole 108 formed in the bottom thereof and receives button 101 so that member 105 can rotate relative to button 101. Forward of opening 102 there is formed a slot 109 which is substantially Z-shaped or shaped like a letter S made with straight lines. A projection 110 upstanding from the forward portion of flattened bottom 104 extends through slot 109. FIGURES 15 and 16(*a*) show operating member 105 in its rearmost position with switch 97 on. When member 105 is moved forward projection 110 strikes the connecting portion of slot 109 and moves button 101 to its off position. Member 105 must be rotated counterclockwise so that projection 110 moves through the connecting portion of slot 109 as shown in FIGURE 16(*b*) so that member 105 can again be moved forwardly to move button 101 to its other on position when projection 110 reaches the other leg of slot 109. Hole 108 is slightly larger than button 101 to provide lost motion when rotating member 105 to prevent actuation of the switch.

FIGURES 17(*a*)–17(*d*) show another delay switching device using a conventional four pole double throw switch having an actuating button 111. The switch is suitably mounted in a handgrip or other support in a manner well known to those skilled in the art. A slide member 112 is also mounted on the handgrip or support by rivets or pins 113 and 114 having flattened heads. The pins extend through slots 115 and 116 in slide member 112. The flattened heads on pins 113 and 114 frictionally hold slide member 112 against accidental movement but permit movement when side force is applied to projections 117 or 118. Slide member 112 has a substantially Z-shaped opening 119 formed therein through which button 111 projects. FIGURE 17(*a*) shows button 111 in an on position while FIGURE 17(*b*) shows button 111 in its intermediate off position and a shoulder of opening 119 prevents movement to the other on position. FIGURE 17(*c*) shows slide member moved to the left by applying force to projection 118 to permit movement of button 111 to its other on position as shown in FIGURE 17(*d*). The necessity of moving slide member 112 when button 111 is in its off position provides a delay in reversing the switch from one on position to another.

It will be evident to those skilled in the art that the disclosed switches could be mounted in other ways and that the present invention could be used for other applications in addition to a surface treating machine.

While only several embodiments of the present invention have been shown and described it is to be understood that they are only illustrative and are not to be taken in a limiting sense. The present invention includes all equivalent variations of the embodiments disclosed and described, and is limited only by the scope of the claims.

I claim:

1. An electric switching device comprising;
(a) switch means having an off position and a pair of on positions,
(b) first contact means defining actuating means for said switch means,
(c) said actuating means being movable between first, second and third positions,
(d) said first position of said actuating means defining a first on position of said switch means,
(e) said second position of said actuating means defining an off position of said switch means,
(f) said third position of said actuating means defining a second on position of said switch means, and
(g) second contact means defining stop means at said second position of said actuating means,
(h) said stop means preventing direct movement of said actuating means between said first and third positions,
(i) one of said first and second contact means being manually movable when said actuator is in said second position to free said actuating means for selective movement into either of said first and third positions whereby said stop means provides a mechanical delay preventing instantaneous movement of said actuating means between said first and third positions.

2. The device of claim 1 wherein said actuating means is laterally shiftable and traverses three separate paths in moving between said first and third positions.

3. The device of claim 2 wherein said switch means has switch button means thereon and is mounted on support means and said actuating means comprises switch operating means movably mounted on said support means, said operating means being laterally movable between first and second extremes relative to said button means in said second position of said actuating means, said operating means being engaged with said button means at said first extreme for movement therewith to said first position and being engaged therewith at said second extreme for movement therewith to said third position.

4. The device of claim 3 wherein said support means comprises the handgrip of an appliance, said handgrip comprising a hollow two-part housing and said operating means being trapped between the two parts for movement relative thereto.

5. The device of claim 3 wherein said support means has a substantially Z-shaped slot therein and said operating means is movable in said slot between said first, second and third positions.

6. The device of claim 3 wherein said switch means comprises a pair of double pole single throw switches each having a switch button means thereon one of said buttons being movable between said first and second position, and the other of said buttons being movable between said third and second position.

7. The device of claim 6 wherein said pair of switches are mounted side-by-side and said buttons are laterally spaced, said buttons being movable in parallel paths, said one button being movable in the same direction from said second to said first position as said other button moves in from said second to said third position, and said operating means traversing a substantially U-shaped path is moving between said first and third positions.

8. The device of claim 7 wherein said operating means has a pair of opposite notches opening outwardly on the bottom thereof for selectively receiving said one or said other button, and an elongated tail portion on the rear of said operating means, said tail portion being loosely pivoted and slidably attached to said support means.

9. The device of claim 1 wherein said switch means comprises a pair of switches each having a switch button means thereon, one of said buttons being movable between said first and second positions, the other of said buttons being movable between said second and third positions, and said actuating means comprises a single operating member for selectively moving either said one button between said first and second positions or said other button between said second and third positions, said operating member being shiftable at second position to engage either said one button for movement to said first position or said other button for movement to said third position.

10. In an electric motor having a field defining first windings and a rotatable armature defining second windings, motor reversing switch means mounted on support means and connected in circuit with said field and armature for reversing the polarity of electrical connections to one of said first and second windings, actuating means for said switch means, said actuating means being selectively and sequentially movable between first, second and third positions, said first position defining a first direction of rotation of said armature, said second position defining a current interrupted position, and said third position defining a second direction of rotation of said armature, the improvement comprising; stop means requiring movement of said actuating means in three separate paths to reverse the polarity of electrical connections to said one of said windings in moving said actuating means between said first and third positions whereby a built-in delay is provided at the current interrupted position in swtching the polarity of electrical connections to said one of said windings to change the direction of rotation of said armature.

References Cited

UNITED STATES PATENTS

| | | | |
|---|---|---|---|
| 2,015,399 | 9/1935 | Grothe | 200—157 XR |
| 2,557,351 | 6/1951 | Jacobson | 200—503 XR |
| 3,069,518 | 12/1962 | Soos | 74—483 XR |

ROBERT K. SCHAEFER, *Primary Examiner.*

H. BURKS, *Assistant Examiner.*